(12) United States Patent
Almawashi

(10) Patent No.: US 12,263,789 B2
(45) Date of Patent: Apr. 1, 2025

(54) BLIND SPOT VISUALIZATION SYSTEM AND METHOD

(71) Applicant: Hayder Tahir Almawashi, Alexandria, VA (US)

(72) Inventor: Hayder Tahir Almawashi, Alexandria, VA (US)

(73) Assignee: Hayder Tahir Almawashi, Alexandria, VA (US)

(*) Notice: Subject to any disclaimer, the term of this patent is extended or adjusted under 35 U.S.C. 154(b) by 250 days.

(21) Appl. No.: 17/730,425

(22) Filed: Apr. 27, 2022

(65) Prior Publication Data

US 2023/0347826 A1    Nov. 2, 2023

(51) Int. Cl.

| *B60R 1/25* | (2022.01) |
|---|---|
| *B60K 35/00* | (2024.01) |
| *B60K 35/28* | (2024.01) |
| *B60K 35/60* | (2024.01) |
| *B60R 11/04* | (2006.01) |
| *B62D 15/02* | (2006.01) |
| *G06T 3/4023* | (2024.01) |
| *G06T 3/4038* | (2024.01) |

(52) U.S. Cl.
CPC ............... *B60R 1/25* (2022.01); *B60K 35/00* (2013.01); *B60R 11/04* (2013.01); *B62D 15/021* (2013.01); *G06T 3/4023* (2013.01); *G06T 3/4038* (2013.01); *B60K 35/28* (2024.01); *B60K 35/60* (2024.01); *B60K 2360/176* (2024.01); *B60K 2360/788* (2024.01); *B60R 2300/103* (2013.01); *B60R 2300/105* (2013.01); *B60R 2300/202* (2013.01); *B60R 2300/303* (2013.01); *B60R 2300/802* (2013.01)

(58) Field of Classification Search
None
See application file for complete search history.

(56) References Cited

U.S. PATENT DOCUMENTS

| 2005/0110621 A1* | 5/2005 | Hahn ........................ H04N 7/181 |
| | | 348/E7.086 |
| 2011/0090073 A1* | 4/2011 | Ozaki ...................... G08G 1/167 |
| | | 340/435 |
| 2016/0200254 A1* | 7/2016 | Raab ........................ B60R 1/25 |
| | | 348/148 |
| 2017/0140229 A1* | 5/2017 | Ogata ........................ B60R 1/00 |
| 2019/0031102 A1* | 1/2019 | Kishimoto ................. B60R 1/30 |
| 2022/0297751 A1* | 9/2022 | Nakahara ............. B62D 15/029 |

FOREIGN PATENT DOCUMENTS

JP        2016217953 A   * 12/2016

* cited by examiner

*Primary Examiner* — Rebecca A Volentine
(74) *Attorney, Agent, or Firm* — Davé Law Group, LLC; Raj S. Davé

(57) ABSTRACT

A blind spot visualization system and method for eliminating blind spots for an operator of a vehicle. The blind spots are caused by obstructions in the vehicle. A first image based on a first frequency range, and a second image based on a second frequency range, is generated. The images of the first frequency range and the images of the second frequency range are combined to create a composite image. Displays on the obstruction, facing the operator, receive the composite image. The displays display the images to the operator so that the blind spots, caused by the obstructions in the vehicle, are eliminated.

40 Claims, 12 Drawing Sheets

BLIND SPOT VISUALIZATION SYSTEM AND METHOD

BRIEF DESCRIPTION OF THE SEVERAL VIEWS OF THE DRAWINGS

In the drawings, which form a part of this specification,

FIG. 6A is an inside view of the embodiment of the system with a driver turning the steering wheel to the left in automatic mode with the left screen turning on;

FIG. 6B is an inside front passenger view of the embodiment of the system with a driver turning the steering wheel to the left in automatic mode with the left screen turning on;

FIG. 7A is an inside view of the embodiment of the system with a driver turning the steering wheel to the right in automatic mode with the right screen turning on;

FIG. 7B is an inside front driver view of the embodiment of the system with a driver turning the steering wheel to the right in automatic mode with the right screen turning on;

DETAILED DESCRIPTION OF SEVERAL EMBODIMENTS

The blind spot visualization system and method eliminates blind spots created by the design of a vehicle, while an operator is operating the vehicle. A typical vehicle has pillars that support the roof and provide additional rollover safety to an operator. These support pillars create blind spots in the operator's field of vision, which puts the operator, and others, at risk. This embodiment places sensors on one side of the pillar and a display on the other side, to make it look like there is no pillar blocking an operator's view.

An embodiment of the blind spot visualization system and method may use sensors, displays, and processors to eliminate blind spots created by support pillars in a vehicle. One or more sensors may be placed on the support pillars opposite the operator. At least one of the sensors will generate images based on the visible frequency range. Additional sensors may be added to generate images based on the infrared frequency range, or any other frequency range that is not based on the visible frequency range. One or more displays may be placed on the support pillars facing the operator, and they may correspond to the location of the sensors to display the images generated by the sensors to the operator. Images from only one sensor may be displayed. Images from more than one sensor may be combined to provide the operator with a composite enhanced view of what is behind the support pillar. The operator may manually activate the displays, or the displays may automatically activate when the vehicle turns to the left or right or when any other type of sensor detects something on the other side of the support pillar.

Figure 1A:
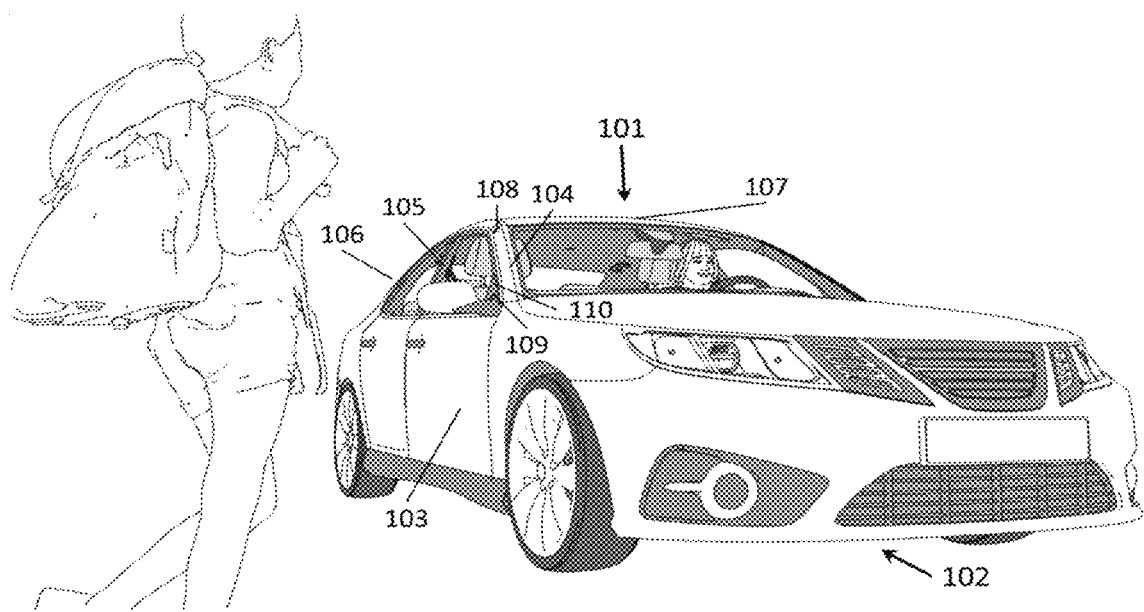
FIG. 1A is a right-side perspective view of one embodiment.
Figure 1B:
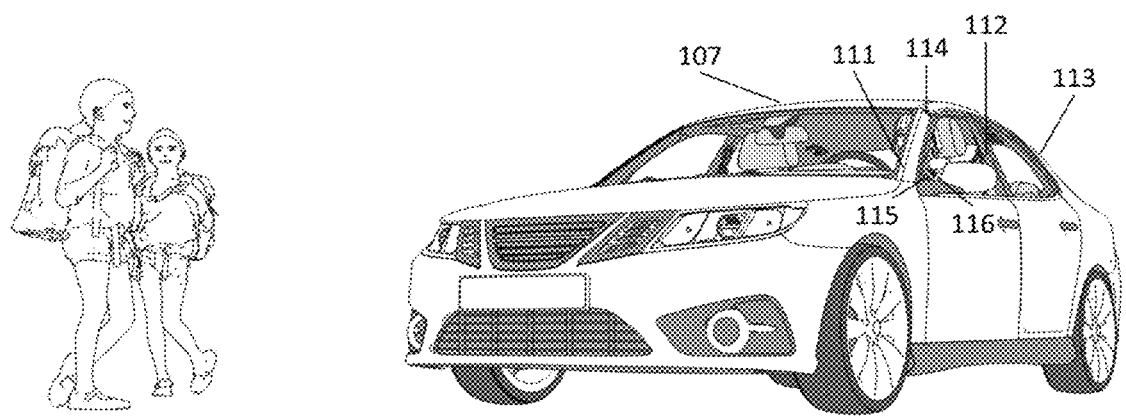
FIG. 1B is a left-side perspective view of the embodiment shown in FIG. 1A.

FIG. 1A is a right-side perspective view of one embodiment. The embodiment 101 may be associated with a common automobile form 102 with common components, such as a body 103, pillars 104, 105, and 106, and a roof 107. Pillars 104, 105, and 106 may support the roof 107 of the automobile. The same may be true on the opposite side of a common automobile form 102. FIG. 1B shows a left-side perspective view of the embodiment shown in FIG. 1A. In this view, pillars 111, 112, and 113 support the roof 107.

Figure 2:
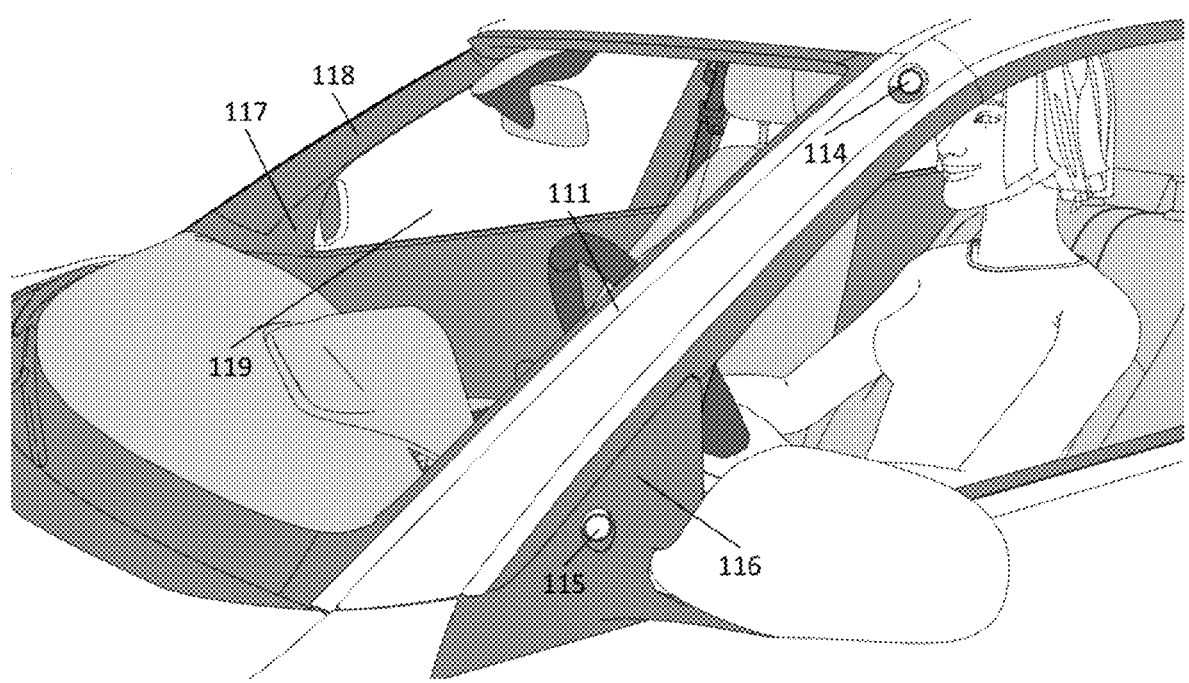
FIG. 2 is a close up of the left side perspective of the embodiment shown in FIG. 1B.
Figure 3A:
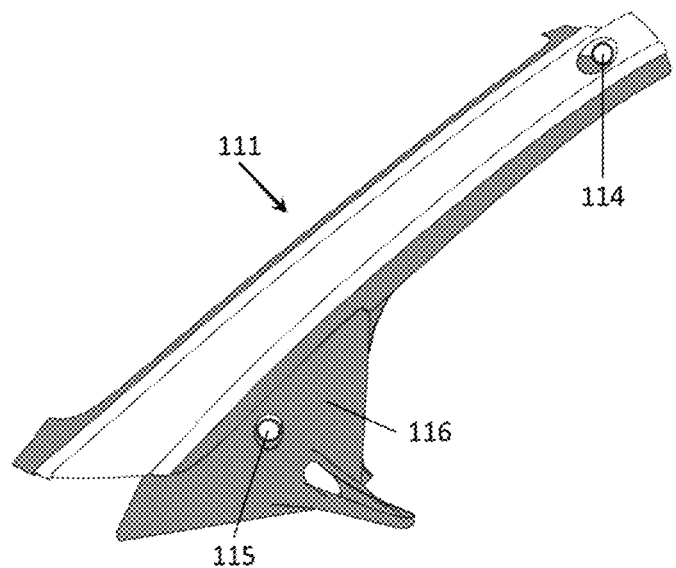
FIG. 3A is an external, partial front view of the embodiment shown in FIG. 1B and FIG. 2.
Figure 3B:
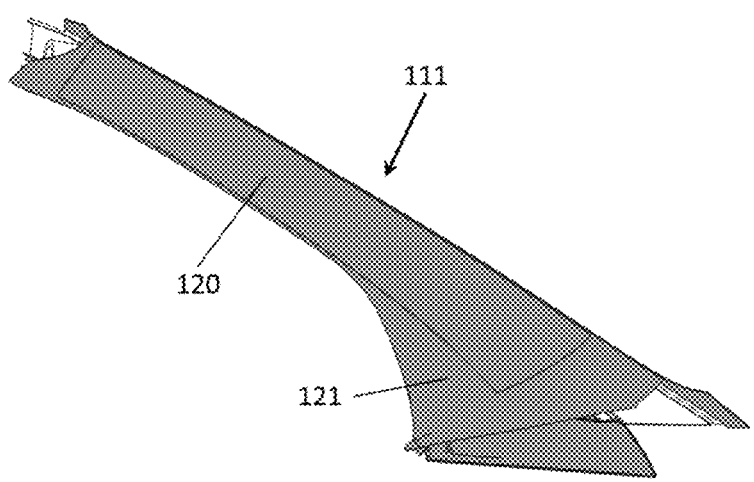
FIG. 3B is an internal, partial view of the embodiment in FIG. 1B or FIG. 2.
Figure 4:
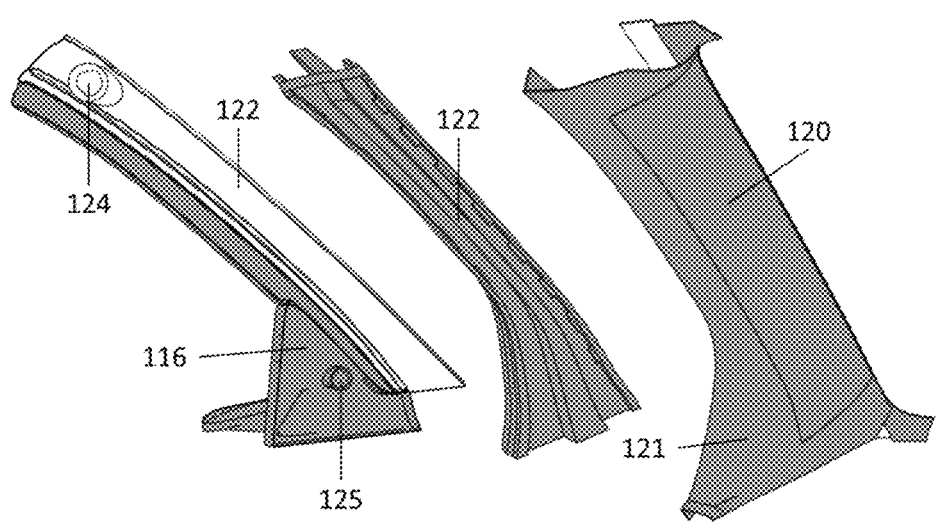
FIG. 4 is an exploded view of the embodiment in a vehicle pillar.

For each pillar 104, 105, 106, 111, 112, and 113, shown in FIGS. 1A, 1B, 2, 3A, 3B, and 4, that the blind spot is to be eliminated, each pillar may have one or more sensors associated with it. FIG. 1A shows sensor 108 on the front right pillar 104 and a different sensor 109 on the front right exterior pillar corner trim 110. FIG. 1A shows two different sensors 108 and 109, but there may be multiple sensors on pillar 104, and on pillars 105 and 106. FIG. 1B shows sensor 114 on the front left pillar 111 and another sensor 115 on the front left exterior pillar corner trim 116. FIG. 1B shows two different sensors 114 and 115, but there may be multiple sensors on pillar 111, and on pillars 112 and 113. FIG. 3A shows an enlarged side view of the left front pillar 111 with sensor 114 and the front left exterior pillar corner trim 116 with sensor 115 from FIG. 2. Furthermore, FIG. 4 is an exploded view of the front left pillar 111, showing the front left exterior pillar trim 122 with holes 124 and 125 that may be added to hold sensors 114 and 115, illustrated in FIGS. 1B, 2, 3A and 4.

As illustrated in FIG. 1A, sensor 108 senses in the visible frequency range, sensor 109 senses in the infrared frequency range, on the right-side of the embodiment 101. FIGS. 1B, 2, and 3A, illustrate sensor 114, which senses in the visible frequency range, and sensor 115 which senses in the infrared frequency range, on the left-side of the embodiment 101. Sensor 114 and 115 may be mounted onto, or built into, the left exterior pillar trim 122 by holes 124 and 125, as illustrated in FIG. 4. The same may be true for the right exterior pillar trim 110 for sensors 108 and 109.

As illustrated in FIGS. 2, 5, 6A, 7A, 7B, and 8, the front right-side interior pillar trim 117 may have a right-side display 118, which may be integrated, mounted, placed onto, or built into, the right-side interior pillar trim 117. Similarly, as illustrated in FIGS. 3B, 4, 5, 6A, 6B, 7A, and 8, the front left-side interior pillar trim 121 may have a left-side display 120, which may be integrated, mounted, placed, or built into the front left-side interior pillar trim 121.

Figure 5:
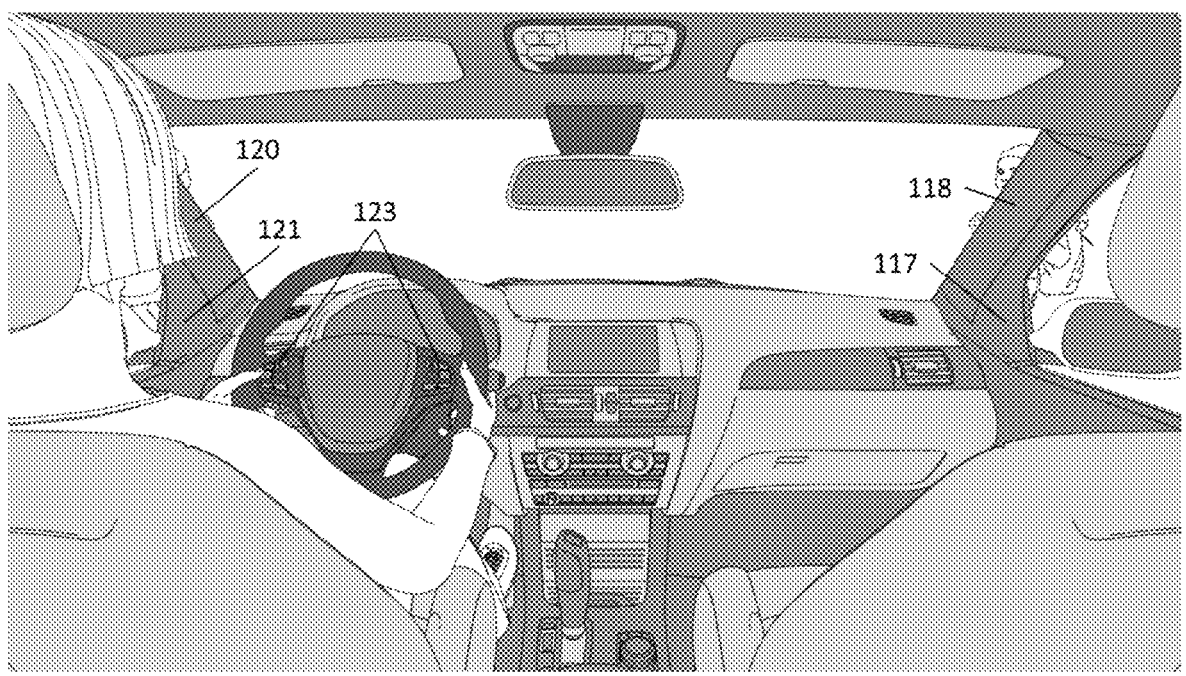
FIG. 5 is an inside view of the front vehicle pillars displaying an embodiment of the system being off or in automatic mode.
Figure 6A:
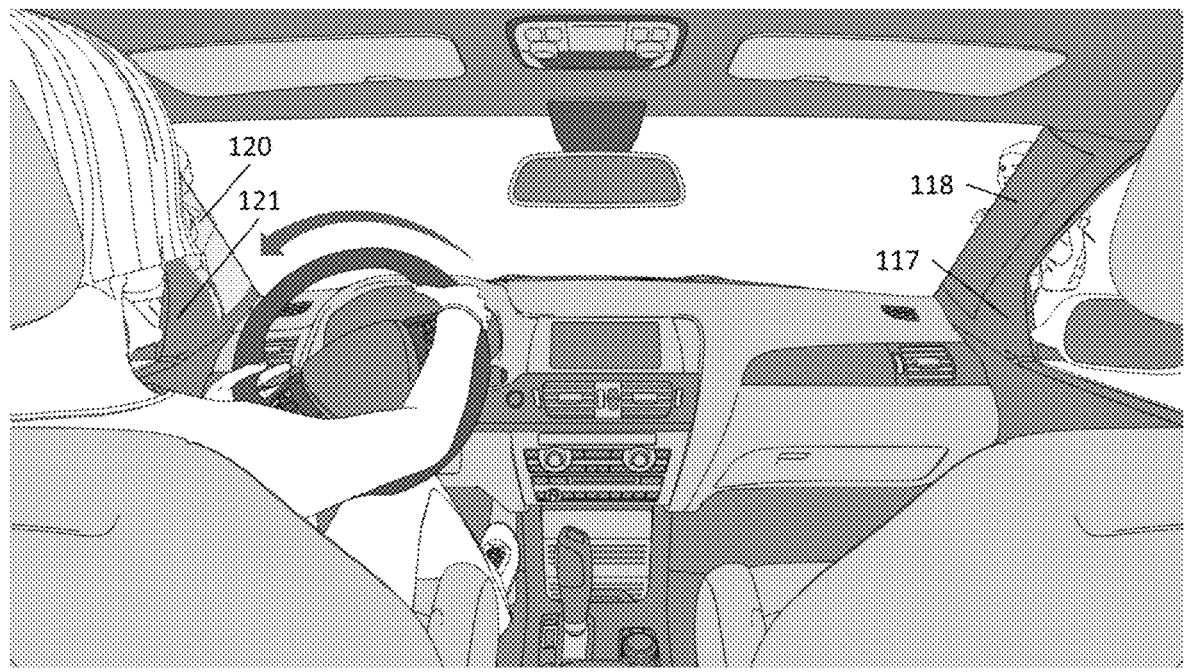
Figure 6B:
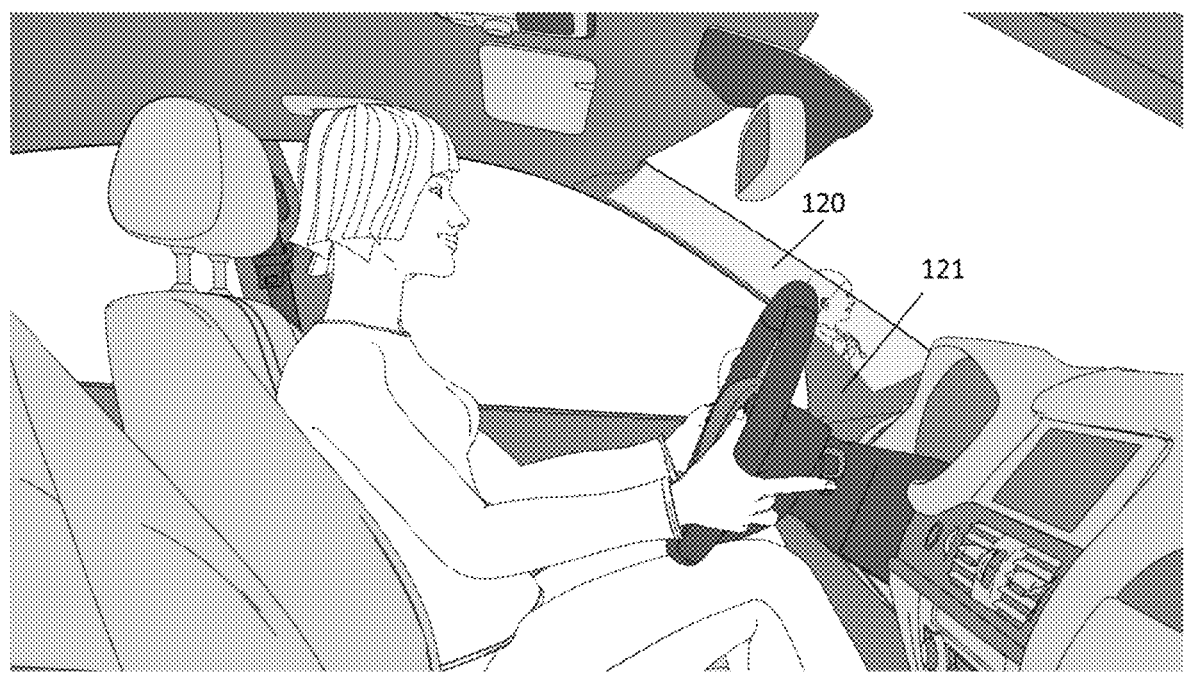

FIG. 5 illustrates an inside view of the displays 120 and 118 not displaying. When displays 120 and 118 are not displaying, the pillars 121 and 117, look just like any other pillar in a vehicle. FIG. 6A demonstrates automatic mode of the embodiment. When the operator of the vehicle is turning towards the left, display 120 begins displaying, however, display 118 does not display because it is not in the direction in which the vehicle is turning. FIG. 6B shows the inside front passenger view of the system activating in automatic mode for a driver when the vehicle is turning toward the left, which eliminates the obstruction by pillar 121 and allows the operator of the vehicle to view what is behind the pillar 121.

Figure 7A:
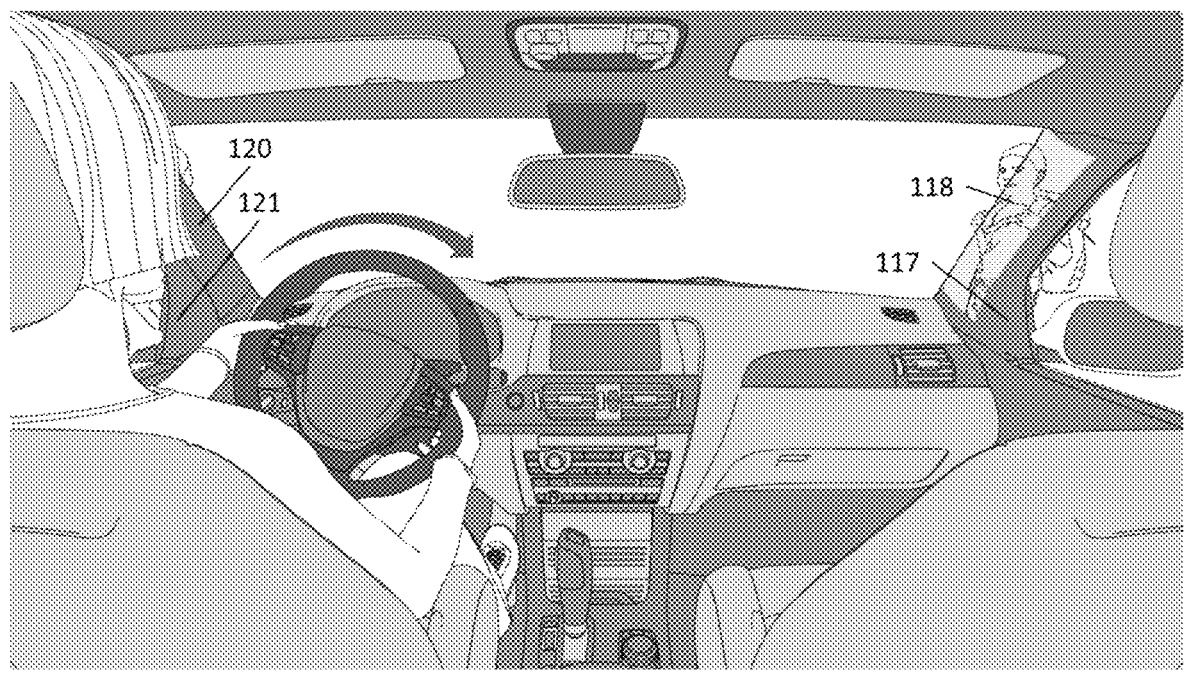
Figure 7B:
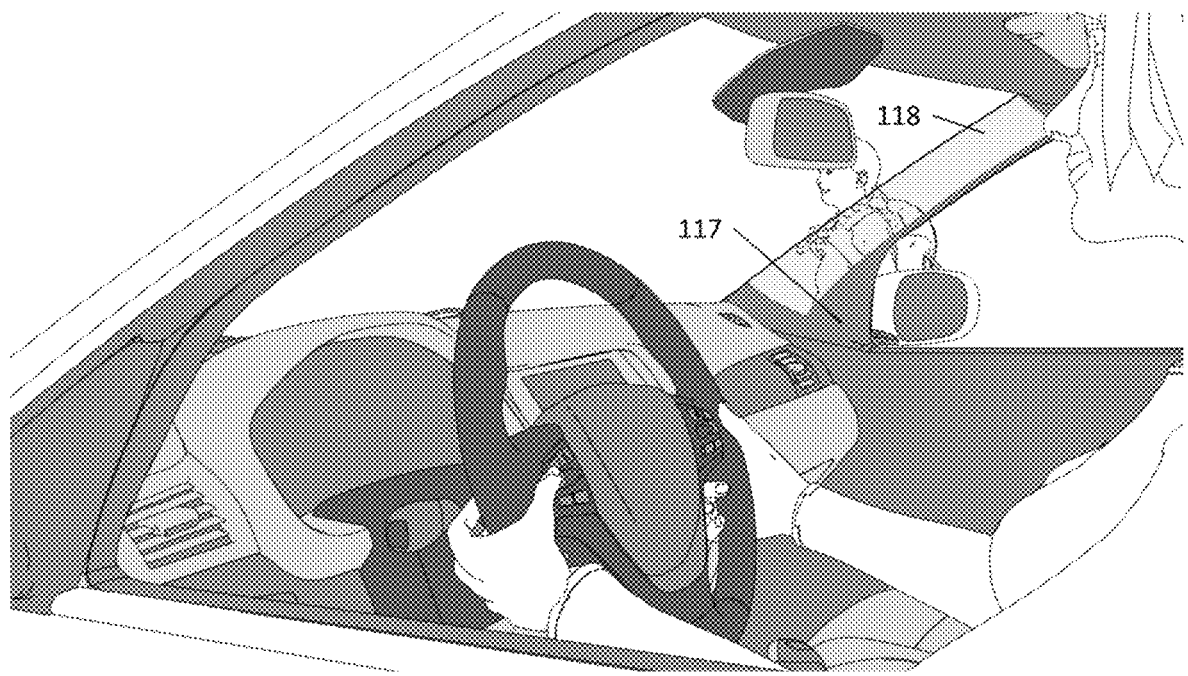

FIG. 7A illustrates automatic displaying when the operator of the vehicle is turning towards the right. Display 118 begins displaying, however, display 120 will not display because it is not in the direction in which the vehicle is turning. FIGS. 7A and 7B illustrates the inside view of the system activating in automatic mode for an operator when the vehicle is turning towards the right, which eliminates the obstruction by pillar 117 and allows the operator of the vehicle to view what is behind the pillar 117.

Figure 8:
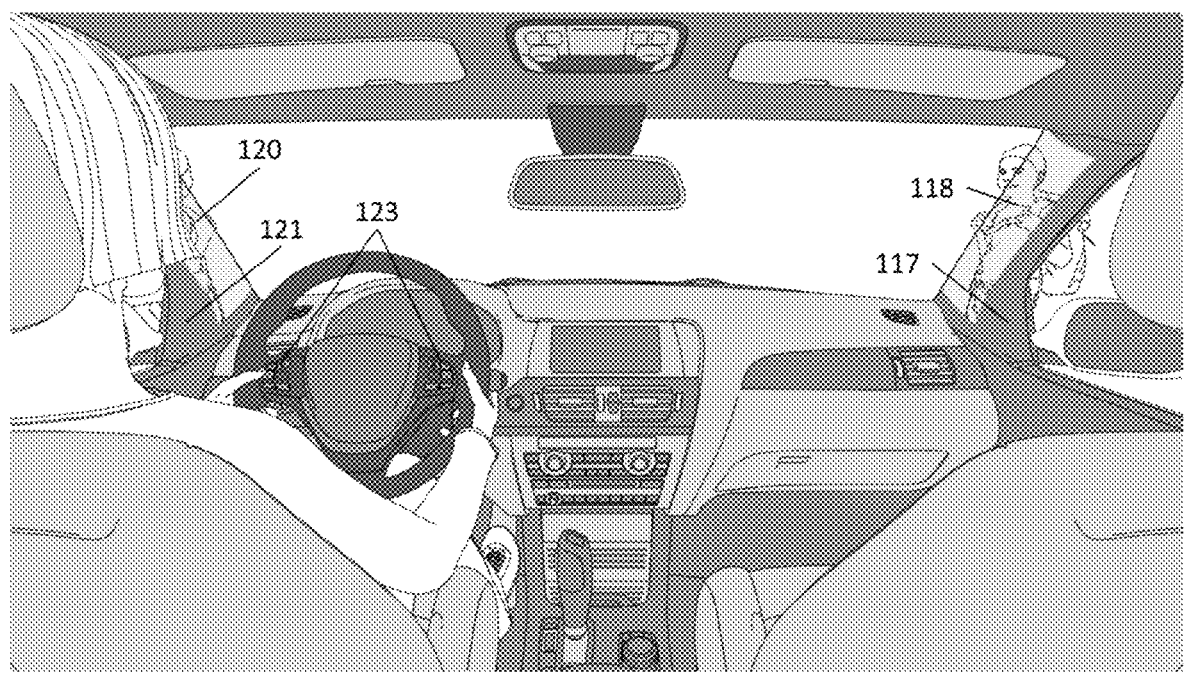
FIG. 8 is an inside view of the embodiment of the system with the two front pillar screens activated in manual mode.

Alternatively, if the operator of the vehicle desires, they can manually initiate the displaying by displays 120 and 118. FIGS. 5 and 8 show the left and right control clusters 123. Manual mode control is implemented through pressing either, or both, left and right buttons in the control clusters 123. When both control buttons in the control clusters 123 are pressed, displays 120 and 118 start displaying, and what is behind both the pillars, 121 and 117, can be seen, as illustrated in FIG. 8. When neither control buttons in the control clusters 123 are pressed, the displays, 120 and 118, do not display. Control clusters 123 may also be employed to actuate the automatic mode.

Figure 9:
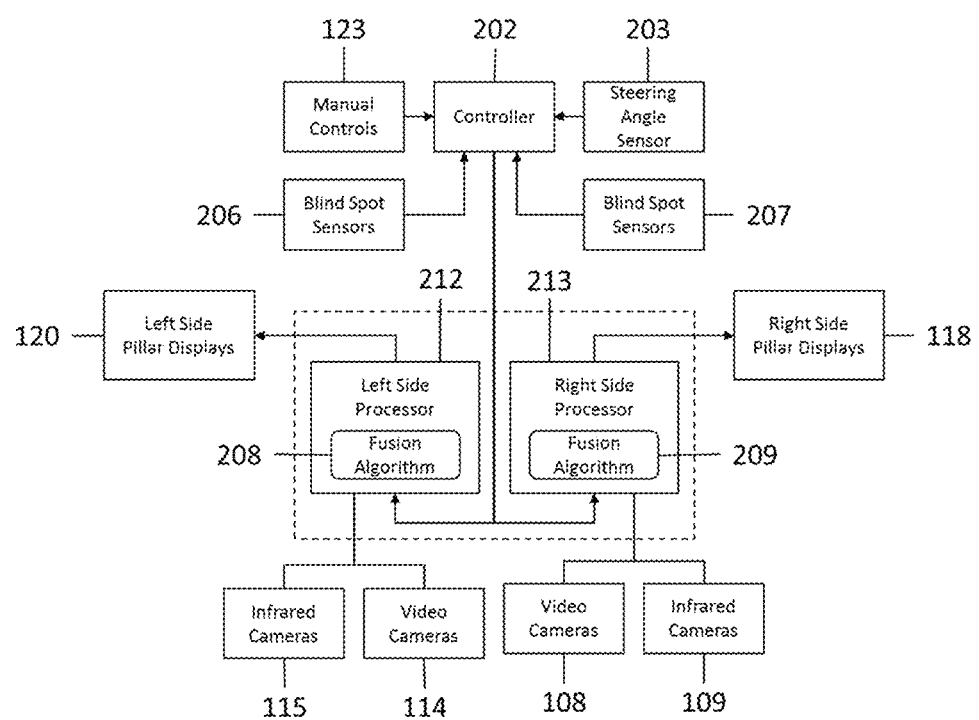
FIG. 9 is a schematic of an embodiment's components.
Figure 12:
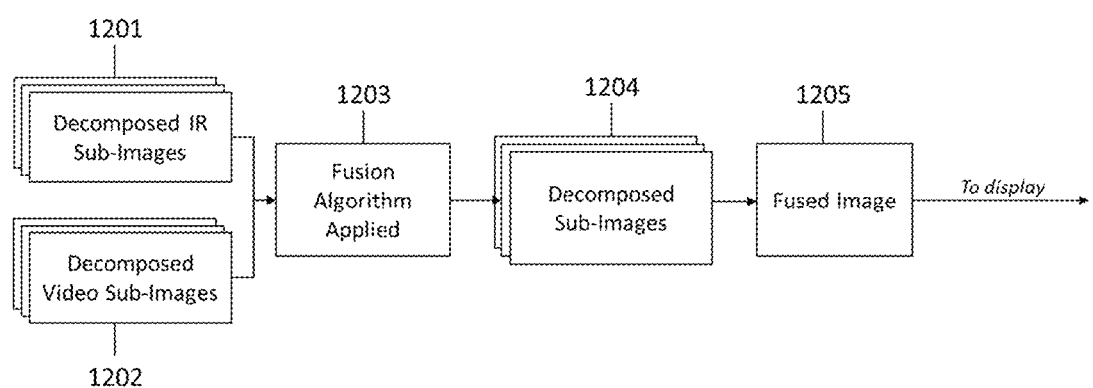
FIG. 12 is a flowchart of how the processors combine images from two different sensors.

As illustrated in FIG. 9, sensor 114, which generates images based on the visible frequency range, and sensor 115, which generates images based on the infrared frequency range, are connected to a left-side processor 212. Sensor 108, which generates images based on the visible frequency range, and sensor 109, which generates images based on the infrared frequency range, are connected to a right-side processor 213. Each processor 212 and 213 may include algorithms to process images based on different frequency ranges. Additionally, each processor 212 and 213 includes a fusion algorithm 208 and 209 for composite imaging. The fusion algorithm 208 and 209 is illustrated in FIG. 12.

Each processor 212 and 213 receives an image corresponding to the infrared frequency range from their respective infrared sensors 115 and 109 as illustrated by FIG. 9. Each processor 212 and 213 also receives an image corresponding to the visible frequency range from their respective visible sensors 114 and 108. Illustrated in FIG. 12, the processors 212 and 213 will decompose the infrared frequency range images 1201 received from the infrared sensors 115 and 109. The processors 212 and 213 will also decompose the visible frequency range images 1202 received from the visible sensors 114 and 108. The decomposition of infrared frequency range images 1201 and the decomposition of the visible frequency range images 1202 may include disassembling each image into individual pixels or groups thereof. Processors 212 and 213 will then apply the fusion algorithm 1203 to the decomposed visible frequency range images 1202 and the decomposed infrared frequency range images 1201. The fusion algorithm application 1203 may include interspersing pixels of the decomposed visible frequency range images 1202 and pixels of the decomposed infrared frequency range images 1201. For example, this may involve repeatedly alternating one or more pixels or a 3×3 or 5×5 block of pixels of the decomposed visible frequency range images 1202 with one or more pixels or a 3×3 or 5×5 block of pixels of the decomposed infrared frequency range images 1201. Alternatively, blocks of pixels of any size may be used. During the fusion algorithm application 1203, a decomposed image of the visible frequency range 1202 and a decomposed image of the infrared frequency range 1201 becomes a single decomposed image 1204. Once the fusion algorithm application 1203 is completed, a fused image 1205 is output to the respective left- or right-side display 120 and 118 as illustrated by FIG. 9. The left and right-side processors 212 and 213 are coupled to the individual displays 120 and 118. The left or right-side processors 212 and 213 output images to the left- or right-side displays 120 and 118 through instructions given by the controller 202. The blind spot visualization system and method may also employ only a single sensor. When the blind spot visualization system and method employs a single sensor rather than two or more sensors, the fusion algorithm 208 and 209 that the processors 212 and 213 execute is not necessary. When one sensor is employed, the image generated is directly sent to the displays 120 and 118 by the left or right-side processors 212 and 213. The blind spot visualization system and method may also employ more than two sensors. The third sensor may be based on a different frequency range than the described sensors 114 and 115, 108 and 109. The fusion algorithm application 1203 that the processors 212 and 213 execute, as illustrated by FIG. 12, would be the same for having more than two sensors responsive to different frequency ranges.

Figure 10:
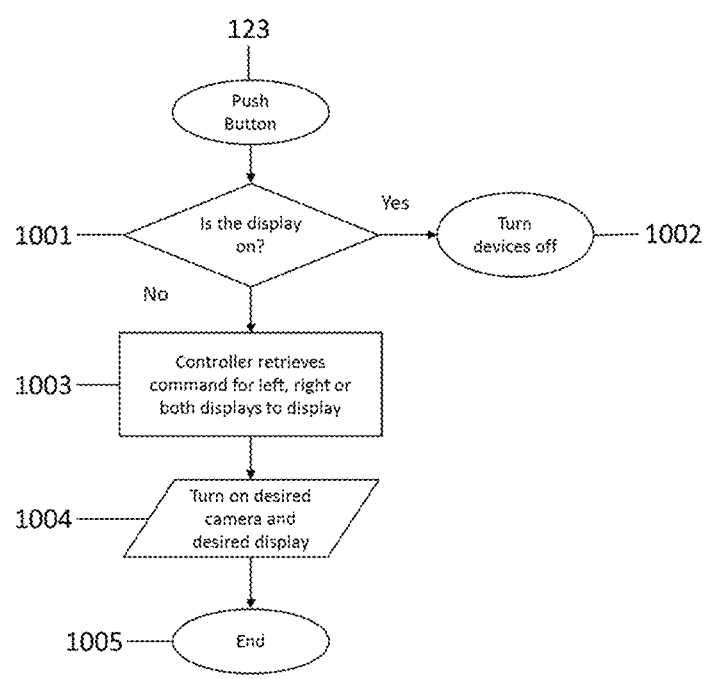
FIG. 10 is a flowchart of how the controller handles manual push button input.

FIG. 10 illustrates the operation of a manual mode. When a button is pressed on the control clusters 123, either display 120 or display 118 may individually begin displaying, or both may begin displaying, so that the operator may, at any time, view what is opposite an obstruction. The controller 202, may receive a signal through the control clusters 123, illustrated in FIGS. 5, 8, and 9. When that signal is received by the controller 202, the controller 202 will run through the process illustrated in FIG. 10. When a button is pushed on the control cluster 123, the control cluster 123 will output a signal to the controller 202, the controller then determines whether the displays 118 and 120 are on 1001. If the displays 118 and 120 are on, they are then turned off 1002. If the displays 118 and 120 are off, the controller 202 retrieves the command for the selection 1003 of either the left-side display 120, the right-side display 118, or both displays 118 and 120. Controller 202, through left and right-side processors 212 and 213, then directs the corresponding displays 118 and 120 and the corresponding sensors 108, 109, 114, and 115, to turn on 1004. The process ends 1005.

Figure 11:
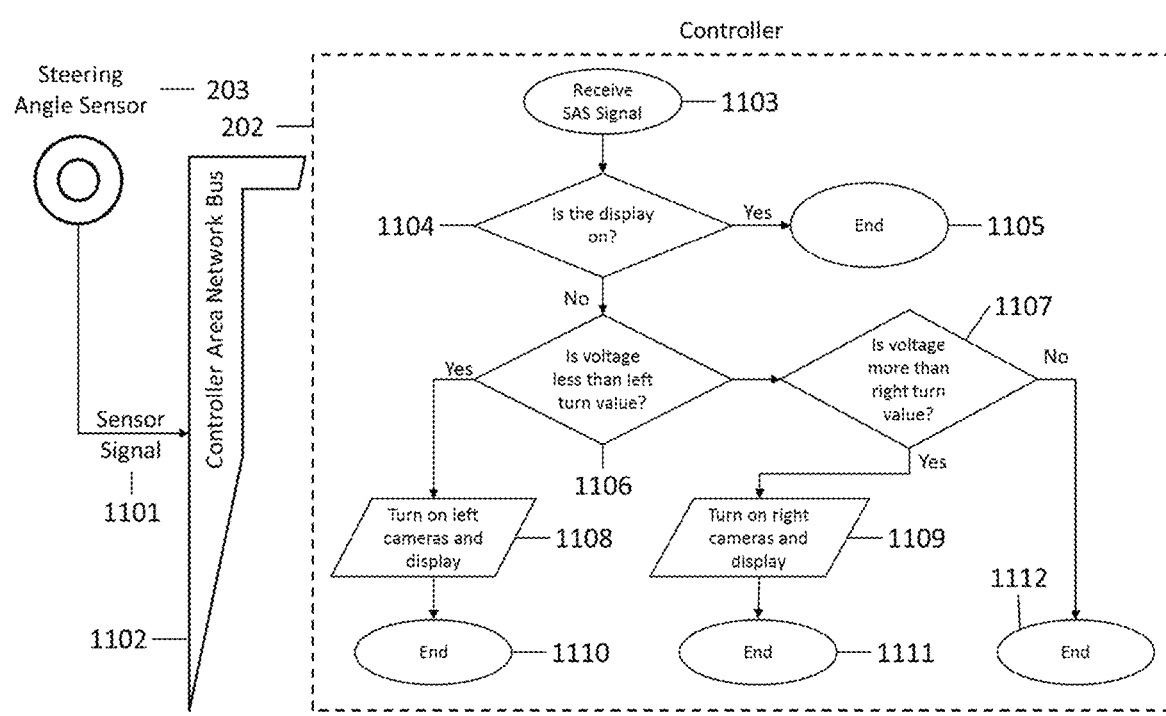
FIG. 11 is a flowchart of how the controller handles automatic initiation.

Alternatively, when the controller 202 receives automatic mode instructions from the control cluster 123, controller 202 monitors a direction signal from the steering angle sensor 203, illustrated in FIGS. 9 and 11. The steering angle sensor 203 may be located anywhere in the steering chain on a vehicle, including from the steering wheel down to the wheels themselves. The steering angle sensor 203 may also be located on the vehicle's tire pressure sensor or may utilize a vehicle's tire pressure sensor. As illustrated in FIG. 11, the steering angle sensor 203 produces a sensor signal 1101, which is received by a vehicle's controller area network bus 1102, which in turn relays that sensor signal 1101 to the controller 202. The controller 202 receives the steering angle sensor signal 1103 and runs through an algorithm to determine which displays 118 and 120 to turn on. First, when the controller 202 receives the steering angle sensor signal 1103, the controller checks to see if displays 118 and 120 are on 1104. If they are on, the algorithm ends 1105. If they are off, the controller checks to see if the steering angle sensor signal 1103 is less than the left turn threshold value 1106. If the steering angle sensor signal 1103 is less than the left turn threshold value 1106, the left-side sensors 114 and 115 and the left-side display 120 are turned on 1108 and the algorithm ends 1110. If the steering angle sensor signal 1103 is more than the right turn threshold value 1107, the right-side sensors 108 and 109 and the right-side display 118 are turned on 1109 and the algorithm ends 1111. If the steering angle sensor signal 1103 is not more than the right turn threshold value 1107 then the algorithm ends 1111.

As illustrated in FIG. 9, the controller 202 may also receive a signal from the vehicle's blind spot sensors 206 and 207. The blind spot sensors 206 and 207 may be blind spot sensors previously installed by the original manufacturer and may direct the controller 202 to turn on sensors 108, 109, 114, and 115, and displays 120 and 118.

It is noted for those skilled in the art, that a variety of modifications and variants can be made without departing from the principle of the present disclosure, and such modifications and variants shall be deemed as the protecting scope of the present disclosure.

What is claimed is:

1. A method of eliminating a blind spot for an operator of a vehicle caused by an obstruction using a manual mode and an automatic mode, comprising:
   (a) generating a first image and a second image of an area on a side of the obstruction opposite the operator, the first image and the second images representing different frequency ranges of radiation from the area;
   (b) decomposing the first image and the second image into a plurality of pixels;
   (c) combining the first image and the second images by interspersing pixels of each of the first image and the second images to create a composite image using a fusion algorithm; wherein each pixel in the composite image is taken directly from the first image and the second image to be fused; wherein a first pixel block of the first image and a second pixel block of the second image have different sizes;
   (d) displaying the composite image on a display visible to the operator, so that the operator sees the area on the other side of the obstruction on the display; and
   wherein the method is configured to allow the operator to view an object behind the obstruction at any time.

2. The method according to claim 1, wherein the first image corresponds to frequencies in a visible frequency range and the second image corresponds to frequencies in an infrared frequency range.

3. The method according to claim 1, wherein the display is attached to the obstruction.

4. The method according to claim 1, further comprising:
   (a) generating a third image and a fourth image of another area on another side of another obstruction opposite the operator, the third and the fourth images representing different frequency ranges of radiation from the other area and each comprised of another plurality of pixels;
   (b) combining the third and the fourth images by interspersing pixels of each of the third and fourth images to create another composite image; and
   (c) displaying on another display visible to the operator the other composite image so the operator sees the other area on the other side of the obstruction opposite the operator on the other display.

5. The method according to claim 4, wherein the third image corresponds to frequencies in the visible frequency range and the fourth image corresponds to frequencies in the infrared frequency range.

6. The method according to claim 4, wherein the other display is attached to the other obstruction.

7. The method according to claim 4, wherein the combining includes repeatedly alternating a pixel block from the third image with a pixel block from the fourth image to create the other composite image.

8. A method of eliminating a blind spot for an operator of a vehicle caused by an obstruction comprising:
   (a) detecting a steering angle of the vehicle;
   (b) generating at least a first image and a second image of an area on a side of the obstruction opposite the operator; wherein the first and the second images representing different frequency ranges of radiation from the area;
   (c) decomposing the first image and the second image into a plurality of pixels;
   (d) combining the first image and the second images by interspersing pixels of each of the first image and the second image to create a composite image using a fusion algorithm; wherein each pixel in the composite image is taken directly from the first image and the second image to be fused; wherein a first pixel block of the first image and a second pixel block of the second image have different sizes; and
   (e) displaying the at least the first image and/or the second image on a display adjacent to the obstruction only when the detecting indicates that the vehicle is turning in a direction that corresponds to the side of the vehicle that the obstruction is on.

9. The method according to claim 8, wherein the detecting includes detecting with a steering wheel angle sensor.

10. The method according to claim 8, wherein the detecting includes detecting with a wheel angle sensor.

11. The method according to claim 8, wherein the displaying includes placing the display over the obstruction.

12. The method according to claim 8, wherein the displaying includes attaching the display to the obstruction.

13. The method according to claim 8, wherein the displaying includes activating the display when the detecting indicates that the vehicle is turning in the direction that corresponds to the side of the vehicle that the obstruction is on.

14. The method according to claim 8, further comprising:
   (a) generating at least another image of another area on another side of another obstruction opposite the operator; and
   (b) displaying that at least one other image on another display adjacent to the other obstruction only when the detecting indicates that the vehicle is turning in the direction that corresponds to the other side of the vehicle that the other obstruction is on.

15. The method according to claim 14, wherein the displaying includes placing the other display over the other obstruction.

16. The method according to claim 15, wherein the displaying includes attaching the other display to the other obstruction.

17. The method according to claim 14, wherein the displaying includes activating the other display when the detecting indicates that the vehicle is turning in the direction that corresponds to the other side of the vehicle that the other obstruction is on.

18. The method according to claim 14, wherein the generating includes generating a third image and a fourth image of the other area on the other side of the other obstruction opposite the operator, the third and the fourth images representing different frequency ranges of radiation received from the other area and each comprised of another plurality of pixels.

19. The method according to claim 18, wherein the generating further comprises combining the third and the fourth images by interspersing pixels of each of the third and fourth images to generate that at least one other image.

20. A system for eliminating a blind spot for an operator of a vehicle caused by an obstruction using a manual mode and an automatic mode comprising:

(a) one or more processors;
(b) a first sensor and a second sensor coupled to the one or more processors, the first sensor and the second sensor being on a side of the obstruction opposite the operator and being configured to generate a first image and a second image of an area on a side of the obstruction opposite the operator, the first and the second images representing different frequency ranges of radiation received from the area and each comprised of a plurality of pixels;
(c) a display coupled to the one or more processors and visible to the operator; and, wherein, the one or more processors:
   (i) combine the first image and the second images by interspersing pixels of each of the first image and the second image to create a composite image using a fusion algorithm; wherein each pixel in the composite image is taken directly from the first image and the second image to be fused; wherein a first pixel block of the first image and a second pixel block of the second image have different sizes; and
   (ii) transmit the composite image to the display so the operator sees the area on the other side of the obstruction on the display; and
   wherein one or more processors are configured to actuate the automatic mode when a sensor signal of at least one steering wheel sensor is more than a predetermined threshold value and does not actuate the automatic mode when the obstruction is in an opposite direction to a turning of the vehicle.

21. The system according to claim 20, wherein the first sensor generates the first image in a visible frequency range and the second sensor generates the second image in an infrared frequency range.

22. The system according to claim 20, wherein the display is attached to the obstruction.

23. The system according to claim 20, wherein the one or more processors alternately intersperse a pixel block of each of the first and second images to create the composite image.

24. The system according to claim 20, further comprising:
(a) a third sensor and a fourth sensor coupled to the one or more processors, the third sensor and the fourth sensor being on another side of another obstruction opposite the operator and being configured to generate a third image and a fourth image of another area on the other side of the other obstruction opposite the operator, the third and the fourth images representing different frequency ranges of radiation received from the other area and each comprised of another plurality of pixels;
(b) another display coupled to the one or more processors and visible to the operator; and, wherein, the one or more processors:
   (i) combine the third and the fourth images by interspersing pixels of each of the third and fourth images to create another composite image; and
   (ii) transmit the other composite image to the other display so the operator sees the other area on the other side of the other obstruction opposite the operator on the other display.

25. The system according to claim 24, wherein the third sensor generates the third image in the visible frequency range and the fourth sensor generates the fourth image in the infrared frequency range.

26. The system according to claim 24, wherein the other display is attached to the other obstruction.

27. The system according to claim 24, wherein the one or more processors alternately intersperse a pixel block of each of the third and fourth images to create the other composite image.

28. A system for eliminating a blind spot for an operator of a vehicle caused by an obstruction comprising:
(a) one or more processors;
(b) a steering sensor configured to transmit a signal to one or more processors;
(c) a sensor coupled to one or more processors, the sensor being on a side of the obstruction opposite the operator and being configured to generate a first image and a second image representing different frequency ranges of radiation from an area on a side of the obstruction opposite the operator;
(d) a display visible to the operator and coupled to the one or more processors; and, wherein the one or more processors:
   (i) determine a direction of turn of the vehicle based on the signal;
   (ii) generate at least a first image and a second image of the area on the side of the obstruction opposite the operator; wherein the first and the second images representing different frequency ranges of radiation from the area;
   (iii) decomposing the first image and the second images into a plurality of pixels;
   (iv) combining the first image and the second images by interspersing pixels of each of the first image and the second image to create a composite image using a fusion algorithm; wherein each pixel in the composite image is taken directly from the first image and the second image to be fused; wherein the first size of the first pixel block and the second size of the second pixel block change during the repeated combination process; wherein a first pixel block of the first image and a second pixel block of the second image have different sizes;
   (v) transmit that at least one image to the display;
   (vi) display that at least one image on the display at any time to allow the operator to view the object behind the obstruction; and
   wherein one or more processors are configured to actuate an automatic mode of the system when a sensor signal of the direction of turn of the vehicle is more than a predetermined threshold value.

29. The system according to claim 28, further comprising a controller area network bus coupled to the steering sensor and the one or more processors.

30. The system according to claim 29, wherein the controller area network bus transmits the signal to the one or more processors.

31. The system according to claim 28, wherein the steering sensor is adapted to be disposed adjacent to a steering chain of a vehicle.

32. The system according to claim 31, wherein the steering sensor includes a vehicle wheel angle sensor.

33. The system according to claim 28, wherein the display is connected to the obstruction by placing the display over the obstruction.

34. The system according to claim 33, wherein the display is built into the obstruction.

35. The system according to claim 28, further comprising:
(a) another sensor coupled to one or more processors, the other sensor being on the side of another obstruction opposite the operator and being configured to generate at least one other image of another area on a side of the other obstruction opposite the operator;

(b) another display visible to the operator and coupled to one or more processors; and wherein, the one or more processors:
  (i) generate at least one other image of the other area on the side of the other obstruction opposite the operator;
  (ii) transmit at least one other image to the other display; and
  (iii) display at least one other image on the other display when the signal indicates that the vehicle is turning in a direction that corresponds to the side of the vehicle that the other obstruction is on.

36. The system according to claim 35, wherein the other display is built into the other obstruction.

37. The system according to claim 28, wherein the sensor generates the image in a visible frequency range and is comprised of a plurality of pixels that are transmitted to one or more processors.

38. The system according to claim 37, further comprising: another sensor coupled to the one or more processors, the other sensor being on the side of the obstruction opposite the operator and being configured to generate another image of the area on the side of the obstruction opposite the operator;

wherein, the one or more processors:
  (i) generate at least another image of the area on the side of the obstruction opposite the operator;
  (ii) transmit at least one other image to the display; and
  (iii) display at least one image and the at least one other image on the display only when the signal indicates that the vehicle is turning in a direction that corresponds to the side of the vehicle that the obstruction is on.

39. The system according to claim 38, wherein the other sensor generates the at least one other image in an infrared frequency range and is comprised of another plurality of pixels that is transmitted to the one or more processors.

40. The system according to claim 39, wherein the one or more processors create a composite image by interspersing the pixels of each of the at least one image and the at least one other image.

* * * * *